United States Patent
Winzinger

(10) Patent No.: US 9,393,732 B2
(45) Date of Patent: Jul. 19, 2016

(54) APPARATUS AND METHOD OF HEATING PLASTICS MATERIAL PRE-FORMS WITH SIMULTANEOUS MOUNTING OR REMOVAL RESPECTIVELY OF HEATING ELEMENTS AND SCREENING ELEMENTS

(71) Applicant: KRONES AG, Neutraubling (DE)

(72) Inventor: Frank Winzinger, Regensburg (DE)

(73) Assignee: KRONES AG (DE)

(*) Notice: Subject to any disclaimer, the term of this patent is extended or adjusted under 35 U.S.C. 154(b) by 6 days.

(21) Appl. No.: 14/461,175

(22) Filed: Aug. 15, 2014

(65) Prior Publication Data

US 2015/0083364 A1    Mar. 26, 2015

(30) Foreign Application Priority Data

Aug. 23, 2013 (DE) .................. 10 2013 109 174

(51) Int. Cl.
 B65G 37/00  (2006.01)
 B29C 49/64  (2006.01)
 B29C 49/06  (2006.01)
 (Continued)

(52) U.S. Cl.
 CPC ............. B29C 49/6409 (2013.01); B29C 31/08 (2013.01); B29C 49/06 (2013.01); B29C 49/42 (2013.01); B29C 49/68 (2013.01); *B29C 2049/283* (2013.01); *B29K 2105/258* (2013.01); *Y10T 29/49815* (2015.01); *Y10T 29/49826* (2015.01)

(58) Field of Classification Search
 CPC ...................................................... B29C 49/68

USPC .......... 198/470.1, 472.1, 473.1, 474.1, 476.1, 198/867.15, 803.6
 See application file for complete search history.

(56) References Cited

U.S. PATENT DOCUMENTS 7,121,821 B2 * 10/2006 Pickel ................ B29C 49/6445
                                                264/458
8,342,314 B2 *  1/2013 Michel ................ B65G 47/905
                                                198/468.5
(Continued)

FOREIGN PATENT DOCUMENTS

DE   10 2008 030 863   12/2009   ............. B29C 49/42
DE   10 2012 101 653    8/2013   ............. B29C 49/42
(Continued)

OTHER PUBLICATIONS

European Search Report issued in corresponding European Patent Appln. No. 14182147.0-1706 dated Feb. 6, 2015 (8 pgs).
(Continued)

*Primary Examiner* — Gene Crawford
*Assistant Examiner* — Lester Rushin
(74) *Attorney, Agent, or Firm* — Hayes Soloway P.C.

(57) ABSTRACT

An apparatus for heating plastics material pre-forms includes a conveying device which conveys the plastics material pre-forms along a pre-set conveying path (P). A plurality of holding elements for holding the plastics material pre-forms and a plurality of screening elements for screening off heat are arranged on the conveying device. The apparatus has a plurality of carrier units on which at least parts of the holding elements and at least parts of the screening elements are arranged and these carrier units are capable of being removed from the conveying device jointly with the parts of the holding elements and screening elements which are arranged thereon.

19 Claims, 7 Drawing Sheets

(51) Int. Cl.
   *B29C 49/68*    (2006.01)
   *B29C 31/08*    (2006.01)
   *B29C 49/42*    (2006.01)
   *B29C 49/28*    (2006.01)
   *B29K 105/00*   (2006.01)

(56) References Cited

U.S. PATENT DOCUMENTS

2004/0161486 A1   8/2004   Pickel ........................ 425/174.4
2013/0220769 A1   8/2013   Stein et al.

FOREIGN PATENT DOCUMENTS

FR         2 950 284      3/2011    .............. B29C 49/68
JP         2006-181756    7/2006    .............. B29C 49/64
WO         WO 03/024693   3/2003    .............. B29C 49/64

OTHER PUBLICATIONS

German Search Report issued in corresponding German Patent Appln. No. 10 2013 109 174.1 dated Apr. 10, 2014 (7 pgs).
Chinese Official Action issued in corresponding Chinese Patent Appln. No. 201410404546.3 dated Mar. 28, 2016 (15 pgs).

* cited by examiner

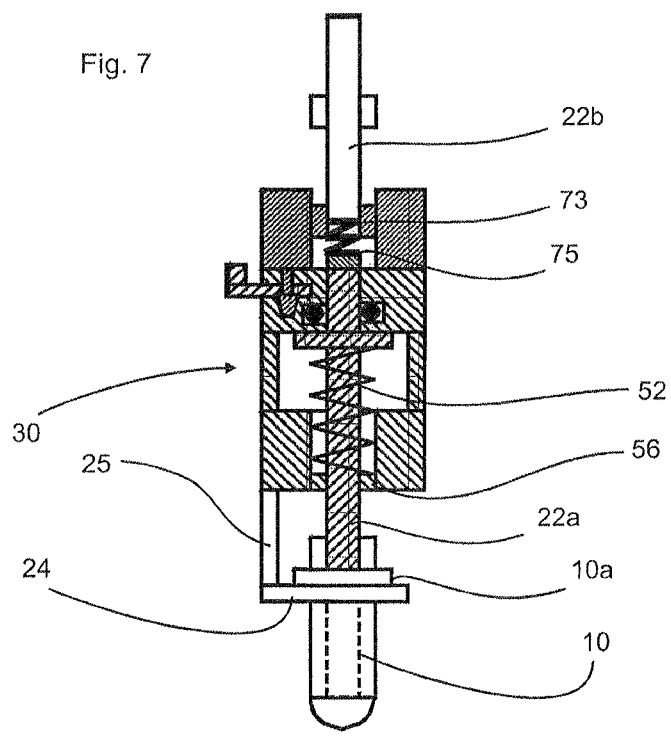
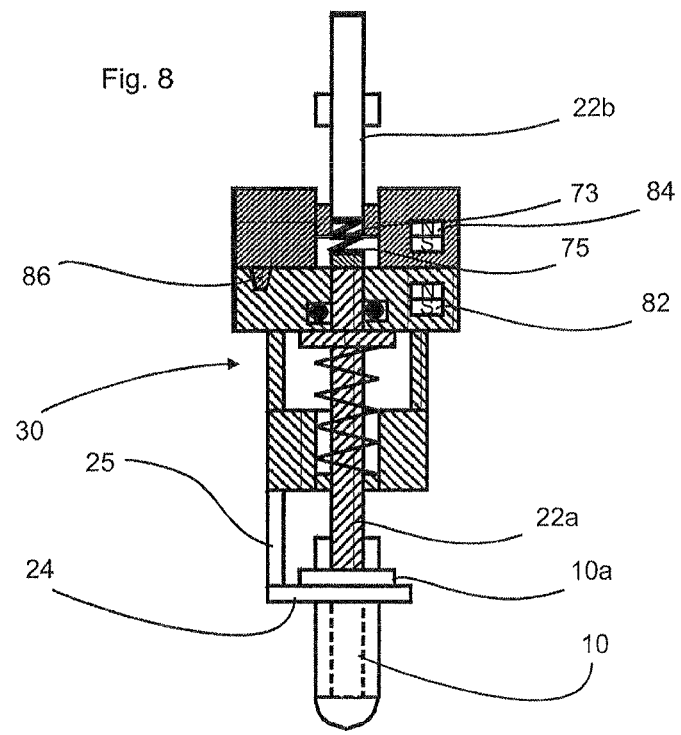

APPARATUS AND METHOD OF HEATING PLASTICS MATERIAL PRE-FORMS WITH SIMULTANEOUS MOUNTING OR REMOVAL RESPECTIVELY OF HEATING ELEMENTS AND SCREENING ELEMENTS

BACKGROUND OF THE INVENTION

The present invention relates to an apparatus and a method of heating plastics material pre-forms. In the field of the plastics-processing industry and, in particular, the drinks-producing industry it has long been known to shape plastic bottles from plastics material pre-forms by blow moulding. In this case these plastics material pre-forms are first heated in a heating device and they are then expanded in this expanded state.

Various heating apparatus are known from the prior art. In this way for example, infrared furnaces are known through which the plastics material pre-forms are conveyed, as well as also microwave furnaces. In the case of heating apparatus of this type it is usual for a plurality of carriers for the individual plastics material pre-forms to be arranged one behind the other on a main carrier. In this case it is desirable for there to be a slight gap between the adjacent plastics material pre-forms in each case.

In addition, apparatus of this type also usually have screening elements which protect the apertures of the plastics material pre-forms—which are not shaped themselves—from excessive heating. In the case of apparatus of this type, however, it is frequently necessary for a change of fittings to be carried out at regular intervals. For this purpose both the holding elements and the aforesaid screening plates are replaced individually, which in some cases is very complicated.

The object of the present invention is therefore to facilitate or make less time-consuming a change of fittings in particular for apparatus of this type for the heating of plastics material pre-forms.

SUMMARY OF THE INVENTION

An apparatus according to the invention for the heating of plastics material pre-forms has a conveying device which conveys the plastics material pre-forms along a pre-set conveying path. In this case a plurality of holding elements for holding the plastics material pre-forms and a plurality of screening elements for screening off heat (from areas of the plastics material pre-forms) are arranged on this conveying device. According to the invention the apparatus has a plurality of carrier units on which at least one part (a component and/or a portion), in particular two or more parts, of the holding elements and at least one part (a component and/or a portion), in particular two or more parts, of the screening elements are arranged and these carrier units are capable of being mounted and/or removed on or from the conveying device jointly with the parts of the holding elements which are arranged thereon and the screening elements.

In this way, it is made possible for the respective holding element and the screening element to be removed at the same time (i.e. in one removal step) and/or also to be mounted at the same time (i.e. in one mounting step). It is preferable for one screening element to be associated in each case with precisely one holding element. It would also be possible, however, for one screening element to be associated with a plurality of holding elements or vice versa for a plurality of screening elements to be associated with one holding element. It is advantageous for the entire screening element to be arranged on the carrier unit. In contrast to apparatus from the prior art it is made possible within the scope of the invention for the entire carrier unit to be exchanged for example for a change of fittings. In this way, the changing times can be considerably reduced.

In other words, it is advantageous for the holding elements and the screening elements to be capable of being removed jointly and/or removed or interchanged in an assembled state.

It would be preferably possible in this case for the screening elements and the holding elements to be fastened in each case to a common holder and for example to be capable of being removed together with the latter from the apparatus.

In particular, one screening element and one holding element are associated in each case with a common holder and, in particular, are connected—in a manner releasable with the latter—to the apparatus or conveying device respectively.

It is advantageous for the screening element to be a screening plate which during operation is situated at least for a time below an aperture of the plastics material pre-form and, in this way, protects this plastics material pre-form from excessive heating. The phrase "at least for a time" means that at the moment of receiving and/or delivering the pre-form the screening plate can also be situated above an aperture. In this sense "below" means, in particular, that the screening element is situated in a plane which intersects the pre-form, in particular at a right angle to the longitudinal axis thereof, in an area which forms the boundary between an area of the pre-form to be heated and an area thereof not to be heated.

In the case of a further advantageous embodiment the apparatus has a plurality of heating units for heating the plastics material pre-forms. It is advantageous in this case for these heating units to be arranged so as to be stationary. In this way, a plurality of heater boxes can be provided for example, which are arranged along the conveying path of the plastics material pre-forms and which heat the plastics material pre-forms by means of infrared. It would also be possible, however, for the heating devices to be microwave hot-air or laser heating devices.

It is advantageous for the respective carrier unit to be capable of being removed without the use of tools from the conveying device. In this way, bayonet-like closures for example could be provided which allow the carrier unit to be removed by hand.

It is advantageous for the carrier unit to be capable of being removed from the conveying device by a movement which extends only in one direction or only in one plane respectively. In the case of the apparatus specified here, as mentioned above, the individual plastics material pre-forms are arranged as closely as possible to one another and the holding elements are also therefore arranged very closely to one another. In particular, by means of a movement which extends at a right angle to a conveying path of the plastics material pre-forms, a highly convenient removal of the carrier unit with the screening and holding elements arranged in it is possible in this case.

It is advantageous for the conveying device to have a continuous chain or a continuous belt. It would also be possible, however, for a carrier device provided around a pre-set axis of rotation to be provided.

In the case of a further advantageous embodiment at least one holding element is designed in at least two parts and a releasable connection is present between the parts of the holding element. In this way for example, an upper part of the holding element, which preferably does not come directly into contact with the plastics material pre-form, can remain on the conveying device and a lower part of the holding element, which holds or carries respectively the plastics material pre-form, can be removed with carrier unit. It is advantageous for the holding elements to be holding mandrels which are capable of being inserted into an aperture of the plastics material pre-forms in order to hold them in this way. External grippers which grip or clamp the plastics material pre-form radially from the outside would also, however, be possible.

In this way, it is preferable for the screening element and the holding element to be removable jointly with a carrier from the heating device.

The gripping function of the holding element can be carried out in an active manner (by way of clamping jaws capable of being controlled or moved respectively by means of a drive (stationary control curve, motor, piezo element, magnet etc.)) or in a passive manner (by way of spring-loaded clamping jaws).

The invention proposed here is capable of being used both in a rotary furnace and in a linear furnace. In working operation a longitudinal movement of the holding element is frequently also carried out, i.e. a movement in a longitudinal direction of the plastics material pre-form to be heated, for example for, the purpose of the holding element dipping into the aperture of this plastics material pre-form. With respect to this longitudinal movement the holding element or the carrier unit respectively are preferably designed in such a way that the part of the holding element which holds the plastics material pre-form is fastened in an axial direction. In this case it would also be possible for part of the holding element to be connected in a rotationally fixed manner to a carrier unit or a receiving means respectively.

It is advantageous for the apparatus also to have rotary units which allow a rotation of the plastics material pre-forms about the longitudinal axis thereof while the latter are being heated. In this way, a uniform heating of the plastics material pre-forms is achieved.

It would also be possible, however, for the holding element or at least one part of the latter to be secured only in an axial direction (for reception), but to be mounted so as to be rotatable with respect to the carrier unit. In this case it is possible for an engagement in a conveying chain or a toothed belt for example to take place for the purpose of turning below the aforesaid receiving means.

In the case of a further advantageous embodiment it would also be possible for the screening element to rotate jointly with the holding element (in particular with direct application on the holding element). With this design it would be possible for the screening element to have a circular cross-section.

In the case of a further advantageous design the releasable connection—mentioned above—between the parts of the holding element allows the transmission of torque. In this way, a non-circular projection of one part of the holding element for example could engage in a non-circular receiving portion of the other part adapted thereto. It is advantageous, however, for this releasable connection to be capable of being separated by a linear movement. In particular, in this case that part of the holding element which holds the plastics material pre-form itself can be drawn off another part by a movement with a component in the longitudinal direction of the plastics material pre-form to be heated.

In the case of a further advantageous embodiment the part of the holding element arranged on the carrier unit is arranged so as to be rotatable with respect to this carrier unit. In particular, in this case the aforesaid part of the holding element is arranged so as to be rotatable with respect to a longitudinal direction of the plastics material pre-form to be heated or a longitudinal direction of the holding element respectively.

In the case of a further advantageous embodiment the carrier unit has a receiving space for receiving components of the holding element. It is advantageous for this carrier unit also to have a stop element which limits a movement of the holding element in the aforesaid longitudinal direction and thus, in particular, prevents the holding element from falling out of the carrier unit.

In the case of a further advantageous embodiment the conveying device has arranged on it fastening devices on which in turn the carrier units are arranged in a releasable manner. In this way, basic holders or basic carriers respectively for example, on which in turn the individual carrier units can be fastened in a releasable manner, could be arranged on chains or on a conveying chain respectively.

The aforesaid second parts of the holding elements can be arranged for example on these basic carriers. In this case it is possible, in particular, for these second parts to be arranged so as to be rotatable with respect to the basic carriers. A rotationally fixed arrangement of these second parts of the holding elements on the basic carriers, however, as mentioned above, would also be possible.

In the case of a further advantageous embodiment the carrier units are arranged on the conveying device by way of releasable fastening devices. It is advantageous for the carrier units to be fastened by way of the releasable fastening devices on the basic carriers mentioned above which can be arranged for example on the conveying device in a fixed manner.

It is advantageous in this case for at least one of these fastening device[s], as mentioned above, to be a fastening device releasable by manual intervention and it is preferable for the fastening device to be selected from a group of fastening devices which contain bayonet-like fastening devices or magnetic fastening devices.

In the case of a further advantageous embodiment the holding element is designed in two parts or in a plurality of parts.

In the case of a further advantageous embodiment the part of the holding element arranged on the carrier unit is arranged so as to be displaceable in its longitudinal direction with respect to the carrier unit. On account of this displaceable arrangement, in particular a dipping of the holding elements into the plastics material pre-forms and/or an extraction of the holding elements out of the plastics material pre-forms is also made possible.

In the case of a further advantageous embodiment the carrier unit has a pre-stressing means in order to pre-stress the part of the holding element arranged on the carrier unit in its longitudinal direction. In this case it is advantageous for the holding element or the part of the holding element respectively to be tensioned on the other part of the holding element. In the case of an apparatus in which the plastics material pre-forms are conveyed suspended with the apertures upwards, the holding element which holds the plastics material pre-form is pre-stressed upwards in this way.

The present invention further relates to a carrier module or a holding apparatus respectively for holding elements for the holding of plastics material containers. This holding and screening module has in this case a carrier unit on which a screening element for screening off heat as well as a part of the holding elements are arranged.

According to the invention the carrier unit additionally has fastening means in order to be mounted on a conveying device and/or removed from a conveying device jointly with the screening element and the holding element.

It is preferable for the carrier module to be designed in the above manner. It is advantageous for the holding element to be arranged so as to be movable on the carrier unit. It is particularly preferred for the holding element to be arranged so as to be rotatable and/or displaceable on the carrier unit.

In a further preferred embodiment exactly one screening element is allocated to at least one holding element and preferably in each case exactly one holding element is allocated to exactly one screening element. In a particularly preferred manner thereby this holding element as well as this screening element are arranged on exactly one carrier unit. In a particularly preferred manner thereby this carrier unit is preferably connected in a releasable manner with a transport device. Thereby, in particular it is dealt with the transport device mentioned above.

In a further preferred embodiment, the screening element has an opening which is bigger than a diameter of a plastics material preform to be transported. In a preferred manner the holding device is furthermore of such a type that the plastics material preform penetrates this opening—in particular during transport.

These embodiments described here with reference to the holding device can in a corresponding manner be applied to the device described above for heating plastics material pre-forms or the transport device likewise described above respectively.

The present invention further relates to a method of mounting or removing holding elements and screening elements on or from an apparatus for the heating of plastics material pre-forms. In this case the holding elements serve to hold plastics material pre-forms and the screening elements serve to keep heat from a thread area of the plastics material pre-forms.

According to the invention at least parts of the holding elements and at least parts of the screening elements are arranged on carrier units and these carrier units are mounted or removed to or from a conveying device jointly with the parts of the holding elements and screening elements arranged on them. In addition, it would be possible for the holding elements and the screening elements to be changed at the same time, i.e. in particular in a common working operation.

It would also, however, be possible for this screening element itself to have a carrier on which is formed the holding element or vice versa, and for the holding element itself also to constitute the carrier on which in turn the screening element is arranged. In this way, the carrier unit on the one hand and the holding and screening elements on the other hand need not necessarily be different components.

If for example the holding element also constitutes a carrier unit, it would be possible for this carrier unit to be formed just by that portion of the holding element on which the screening element is also arranged.

It is advantageous for the holding elements to be mounted or removed at the same time as the screening elements associated with them.

In particular, the conveying path of the pre-forms is situated inside the apparatus substantially in a horizontal plane. In particular, the dipping movement of the holding elements into the pre-forms takes place in a direction at a right angle to this plane. This direction is thus in particular directed towards the centre of the Earth. The (extended) axis of rotation of the holding elements or pre-forms respectively also, in particular, intersects the centre of the Earth.

In particular, the carrier unit is connected to the basic carrier in a releasable manner, in which case the holding element and/or the screening element is or are connected to the carrier unit in a releasable manner. In particular, at least one, and in particular all, of these releasable connections is or are a closure, in particular a bayonet closure or a magnetic (plug-in) connection, which is releasable by hand (without the aid of tools). It would also be possible, however, for other fastening means such as screws to be used.

The screening element is made, in particular, rectangular or square and preferably has a hole in the middle thereof through which the pre-form or the holding element respectively extends at least for a time and locally. This design allows, in particular, an arrangement of two adjacent screening elements with respect to each other in such a way that as little heat or radiation as possible can penetrate between them into the region of the apertures of the pre-forms. The gap between two screening elements is, in particular, less than 1 cm, preferably less than 3 mm. In this case the screening plates are arranged so as to be stationary or immovable with respect to the basic carrier.

The function of "rotation of the holding element" can be implemented by a drive which transmits the torque thereof to the disconnection point by way of a coupling in order to release the holding element, or by a drive which acts directly upon the holding element.

Exactly the same applies to the function of "lowering or raising the holding element": in this case the drive can either act directly upon the holding element and move it, or the drive drives an element which is not jointly interchanged and the force is transmitted to the holding element by way of this element.

Alternatively, drives acting magnetically can be used in both cases, so that mechanical couplings or additional transmission elements respectively need not be present.

The apparatus, in particular, is operated in a continuous manner, i.e. a continuous conveying of the pre-forms is carried out during the heating.

In particular, a plurality of pre-forms are received by the holding elements of the apparatus at equidistant intervals from one another and, in particular, are also conveyed in this way.

In particular, a change can be carried out automatically by an automatic device situated adjacent to the apparatus. This automatic device could be operated in a clock-timed or continuous manner and could remove holding elements and/or screening elements from the apparatus with an arm and replace them with new ones. A magazine with a store of replacement parts can be arranged on the automatic device. It would also be possible for a quick-change mechanism to be triggered by an actuating cam—capable of being supplied—shortly before or upon reaching the changing position in the case of the stationary automatic device, so that the automatic device need only remove and introduce the parts, without actuating the mechanism. Alternatively it would be possible to allow the holding elements plus the screening means to drop through the cam into a box, so that the automatic device need only introduce the new holding elements plus the screening means. After the changing operation the automatic device can then be equipped again by hand.

BRIEF DESCRIPTION OF THE DRAWINGS

Further advantages and embodiments are evident from the accompanying drawings. In the drawings

FIG. 7 is an illustration of an arrangement according to the invention in a further embodiment;

FIG. 8 is an illustration of an arrangement according to the invention in a further embodiment;

DETAILED DESCRIPTION OF THE INVENTION

Figures 1, 2:
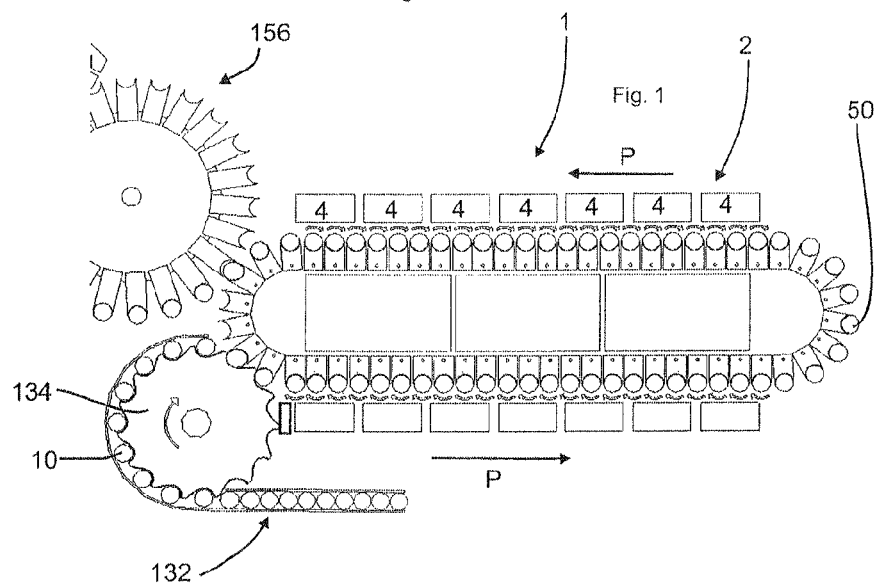
FIG. 1 is a diagrammatic illustration of an apparatus for the production of plastics material containers.
FIG. 2 is an illustration of a carrier unit with a screening element and a holding element.

FIG. 1 is a diagrammatic illustration of a plant for the production of plastics material containers. In this case an apparatus 1 according to the invention is provided for the heating of plastics material pre-forms 10. This apparatus has in this case a plurality of heating elements 4 which are arranged along a conveying path P of the plastics material pre-forms. The heating elements 4 are also present on the other side of the apparatus 1, only not provided with reference numbers.

The reference number 50 designates diagrammatically a holding apparatus for holding the plastics material pre-forms 10. These are first separated in a separation device 134 by way of a supply device 132, such as a supply rail, and are then supplied to the apparatus 1. The reference number 2 designates in its entirety a conveying device for conveying the plastics material pre-forms which are designed in this case in particular in the form of a circulating chain.

The reference number 156 designates a conveying device which transfers the heated plastics material pre-forms to a further apparatus, such as in particular a stretch blow moulding machine or a sterilization device.

FIG. 2 is a detailed illustration of an apparatus according to the invention. In this case a conveying device 2 (shown only diagrammatically) for example in the form of a chain is provided, on which is arranged the holding apparatus 50. This holding apparatus 50 has a basic carrier 6 arranged in a fixed manner (for example on a conveying chain or a conveyor belt). The carrier unit 30 is arranged on the basic carrier 6 by way of a releasable fastening device 40. This fastening device 40 can be for example a fastening device with a manual lever which is pre-stressed in a starting position by means of a pre-stressing means such as a spring. In addition, however, this manual lever 78 can also be fastened in a receiving means, for example when a holder has an associated insertion cone.

The reference 22b designates a second part of the holding element which in this illustrated design is arranged on the conveying device or in the event of removal also remains on the conveying device respectively. A toothed wheel 25, which serves for the rotation of the heating mandrel or the holding element respectively, can be arranged on this second part 22b of the holding element. As mentioned above, this toothed wheel can also be fastened to the lower part 22a of the holding element, in particular if the holding element or the carrier unit 30 respectively has a lateral recess (not shown) through which a chain can pass. In that case it would be possible for the second part 22b to be omitted. The reference number 64 designates a rotary entrainment means which transmits the rotation from the second part 22b of the holding element 22 to the first part 22a of the holding element 22.

The reference number 10 designates a plastics material pre-form which has a carrying ring 10a and which is held by an engagement of the first part 22a of the holding element 22.

The reference number 24 designates the screening element mentioned above, which serves to screen off heat from a thread area of the plastics material pre-form 10. The reference number 25 designates holding pins with which the screening element is arranged on the carrier unit 30. As an alternative to the holding pins it is also possible for a holding plate to be used. In this case it is preferable for further fastening means (not shown) to be additionally provided, which also allow a removal of the screening element 24 from the carrier unit 30. In this way, it is advantageous for the screening element 24 to be screwed so as to be additionally capable of being removed or it can also be arranged with a quick-action closure on the carrier unit. It is possible in practice in fact that in individual cases only the screening element 24 or only the holding element 22, 22a has to be replaced, for example if two plastics material pre-forms 10 with the same internal diameter are to be heated but which have carrying rings of different size. In this case it would only be necessary to change the screening element 24. The reference number 54 designates an upper stop of the holding element or the part 22a thereof respectively and the reference number 62 designates a mounting by which the part 22a of the holding element is mounted so as to be rotatable with respect to the carrier unit 30. The first part 22a of the holding element can be pre-stressed upwards by way of a pre-stressing element 52 which rests against a stop 56, and, in this way, it can also be pre-stressed against the second part 22b of the holding element. As a result, only one curve directed only in one direction is necessary in the case of a curve control means. In other words, the curve need not lift the holding element once again.

Figure 3:
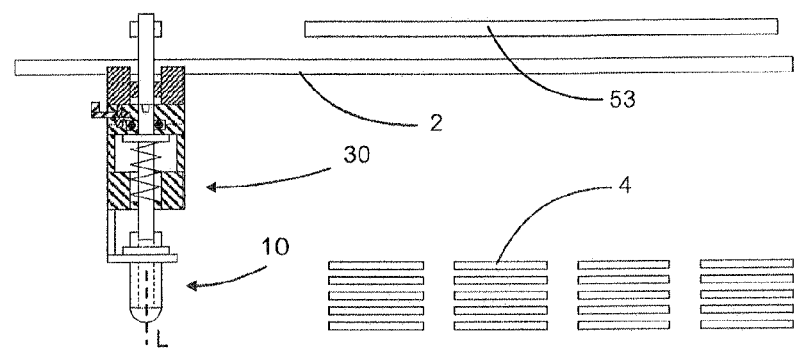
FIG. 3 is an illustration of a holding element with a carrier unit in an apparatus for heating plastics material pre-forms.

FIG. 3 shows a further illustration of an apparatus according to the invention. In this illustration the heating elements 4 past which the plastics material pre-form 10 is conveyed are also shown. A heating element 4 has a plurality of infrared radiators which are arranged at different levels and which, in particular, are capable of being actuated separately from one another. In this way, different areas along the longitudinal axis of the pre-form can be heated differently. In addition, two adjacent heating elements 4 can be actuated differently with respect to their power. Furthermore, in this case the conveying chain is again shown as well as a rotary element, such as for example a driving means or a set of teeth 53 or a chain, which allows a rotation of the holding element or mandrel respectively. Alternatively, however, instead of the driving means 53 it would also be possible for each individual holding element to have a separate drive, and in particular a direct drive. In this way for example, electric motors could be provided which drive the holding elements in a rotating manner with respect to the longitudinal direction L thereof. Alternatively, a magnetic curve would also be possible if the toothed wheel 25 were replaced by permanent magnets. It should be noted in this case that the screening means 24 and the carrying ring 10a of the pre-form 10 embedded in or above it are situated directly above the uppermost position of the heating elements 4.

Figure 4:
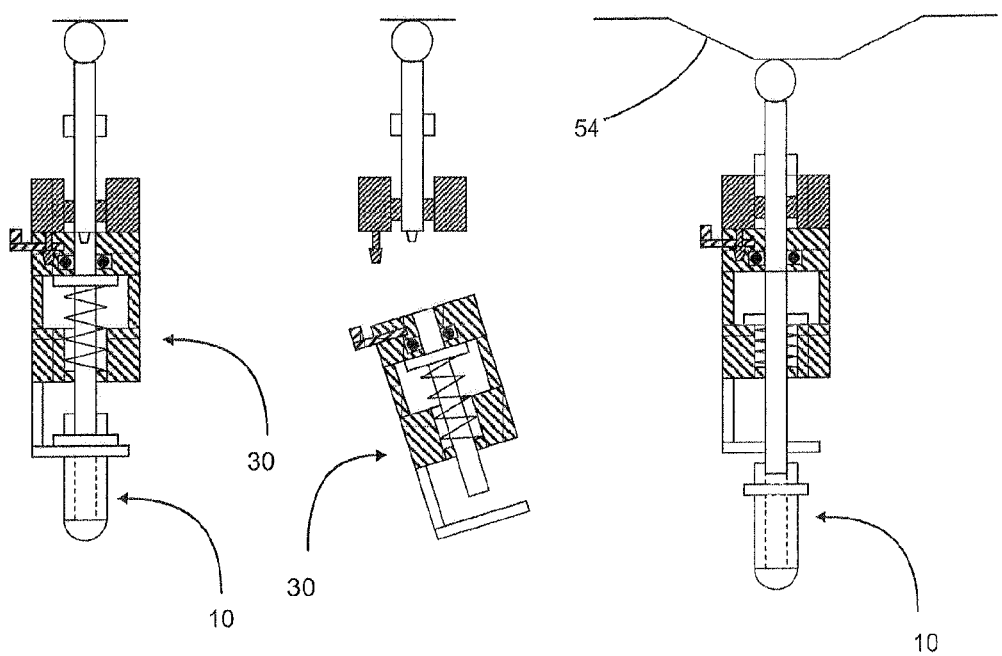
FIG. 4 shows three illustrations of different operating states of a holding element.

FIG. 4 shows three different operating settings of a holding element according to the invention. In the left-hand illustration a working operation is shown in which the holding element is conveyed with the plastics material pre-form 10 arranged on it through a heating tunnel for example. The central illustration shows a rapid change in which the carrier unit with the screening element arranged on it or the holding element respectively has just been released from the basic carrier. The right-hand illustration shows a position in which the holding element dips into the plastics material pre-form 10. In this case a guide curve 54 is provided which effects this dipping into the plastics material pre-form 10. The element 22b transmits the force of the drive in this case to the holding element 54.

Figure 5A:
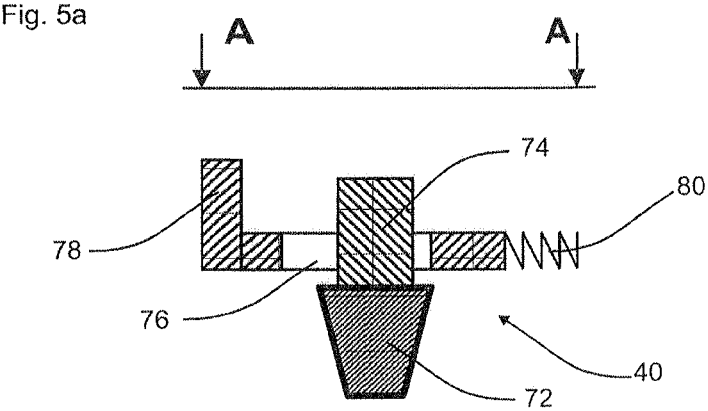
FIGS. 5a, 5b are two illustrations to demonstrate a fastening mechanism for fastening the holding element.
Figure 5B:
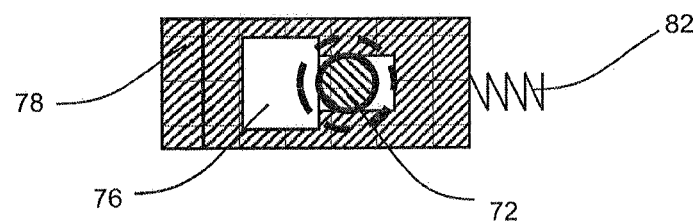

FIGS. 5a, 5b show the fastening means by which the carrier unit 30 is fastened to the basic carrier. This fastening means has in this case an engagement device 72 which is arranged on the basic carrier 6 and which is arranged on a projection 34. This engagement device 72 can in turn engage behind an area of the carrier unit. The reference number 82 designates a pre-stressing means which pre-stresses a manual lever 78 towards the left in this case, i.e. into a closed setting. By pressing of the manual lever 78 the opening 76 can be displaced towards the right and, in this way, the engagement means can be released from the actuating element 78. It would also be possible, however, for the fastening device to be designed in the reverse manner, i.e. for example for the engagement element 72 to be arranged on the carrier unit.

FIG. 5b illustrates a position in which the carrier unit 30 is fastened to the basic carrier 6. It is also possible for the element 72 to have attached to it an inclined plane which co-operates with the edge of the opening 76 in such a way that the carrier unit is pre-stressed upwards by the spring 82 in order to achieve a precise positioning vertically.

Figure 6:
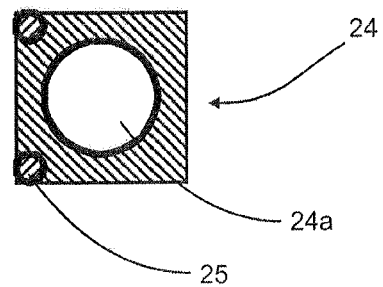
FIG. 6 is an illustration of a screening element.

FIG. 6 is an illustration of the screening element 24. It will be noted that this screening element 24 has an opening 24a through which the plastics material pre-form is capable of being passed at least in part. It is advantageous for this screening element 24 to be made reflecting on the underside thereof in order to reflect radiation, in particular infrared radiation. It is advantageous for the screening element 24 additionally to be made rectangular or square, so that a gap does not occur between two adjacent screening elements through which thermal radiation could pass. It would be possible and preferable for the opening 24a to be selected to be sufficiently large for even the carrying ring of the plastics material pre-form to be capable of being passed through it. This is advantageous if the plastics material pre-form is raised from below or if the screening element is lowered.

FIG. 7 shows a further embodiment of an arrangement according to the invention. In the case of this design, in particular, the engagement between the first part 22a and the second part 22b of the holding element is modified. A spring element 73 will be noted in this case as well as a coupling device 75, such as for example a pre-stressed coupling disc. In this way, it is possible to dispense with the insertion of the second part 22b of the holding element into the first part. The torques are transmitted in this case by way of the coupling element 75.

FIG. 8 shows a further embodiment of an arrangement according to the invention. In this case too, a coupling element 75 is again provided, which transmits the rotational moments or torques. The connecting mechanism between the carrier unit 30 and the basic carrier, however, is modified. In this case magnets 82, 84 are provided which hold these two elements against each other. In addition, a centering element 86 is provided which has the effect that the carrier unit 30 is held precisely in the position provided for it. The two magnets 82, 84 are, in particular, permanent magnets, but it would also be possible for at least one magnet 82, 84 to be designed in the form of an electromagnet.

Figure 9:
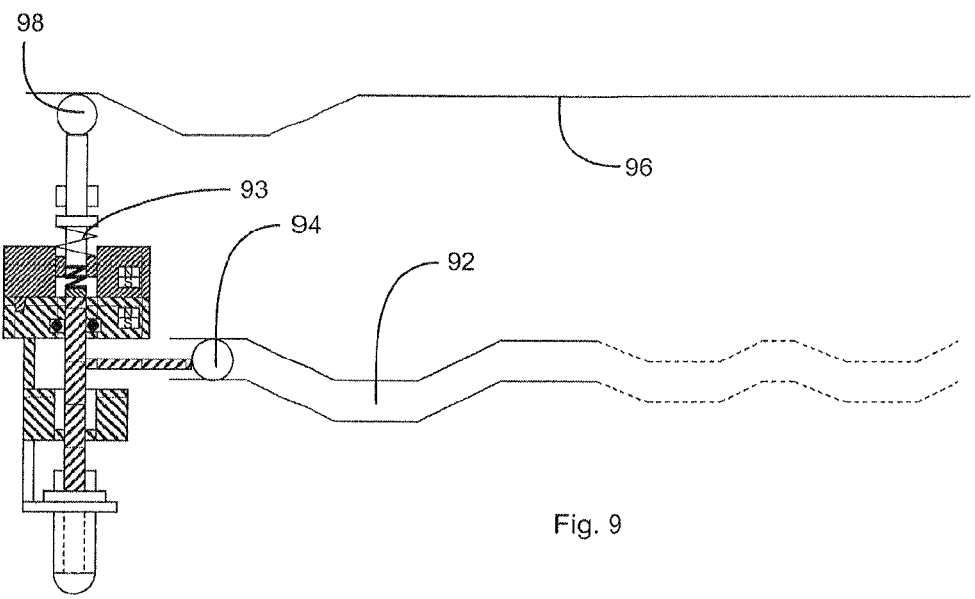
FIG. 9 is an illustration of an arrangement according to the invention taking into consideration guide curves.

FIG. 9 shows a further design of the apparatus according to the invention. In this case a first guide roller 94 is provided which co-operates with a guide curve 92. The dipping movement of the holding element into the plastics material pre-form is carried out as a result. The second part of the guide curve 92 indicated in broken lines could be used in order to temper specified areas of the plastics material pre-form in a different manner from other ones. In this way, it would in fact be possible for the holding element to be decoupled in each case from the rotational movement (by the first part 22a being lowered or raised), so that a rotational movement is regularly discontinued for this time and the plastics material pre-form is heated only on the desired side (preferential heating).

Figure 10:
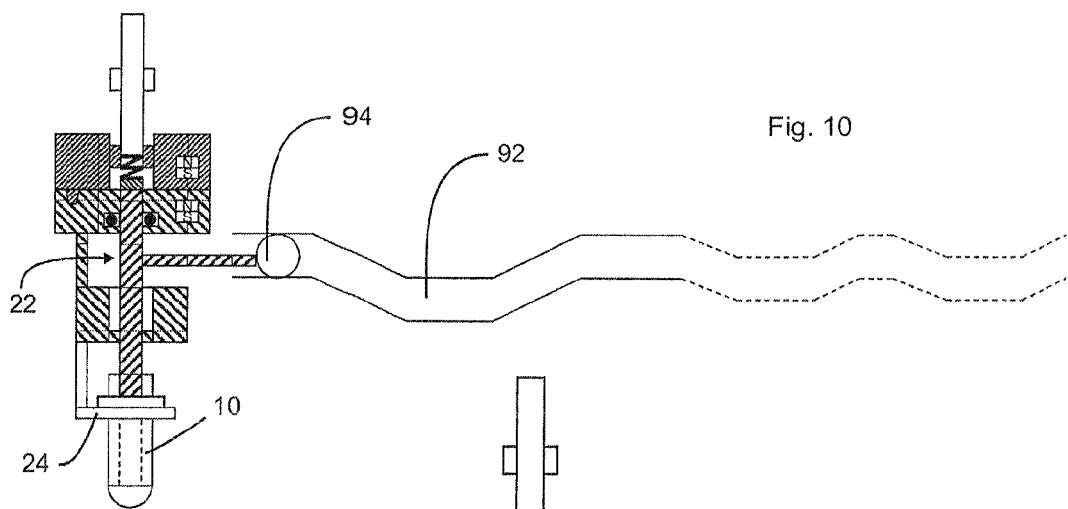
FIG. 10 is an illustration similar to FIG. 9, but without an upper guide curve.

The reference number 93 designates an optional spring for pressing up the second part 22b of the holding element in order to pre-stress the latter for example against a guide curve. It is pointed out that the guide curve is situated not in the same plane as the holding element, as shown in FIG. 10, but behind the plane of the drawing. A lowering and raising of the holding element 22 can be carried out by way of the guide curve 96 and the guide roller 98. The position of the two guide curves 96 and 92 and the strokes thereof are shown in this case only diagrammatically. On the other hand, the stroke of the curve 96 should be at least as large as the aperture area of the pre-form 10 to be protected is long, so that the latter can be lifted completely over the screening during the dipping movement during reception.

FIG. 10 shows a further design of the apparatus according to the invention. In the case of this design a guide roller 98 is no longer provided, but only a rotary entrainment means. An additional linear drive for example could also be provided in this case in order to carry out the longitudinal movement of the holding element, i.e. the movement in the longitudinal direction of the plastics material pre-form. In this case the function of "lowering the mandrel" for receiving a pre-form could be taken on completely by the curve 92.

Figure 11:
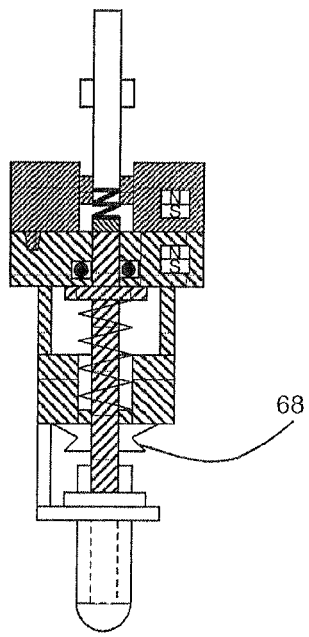
FIG. 11 is an illustration of an arrangement according to the invention, in particular for sterile applications.

FIG. 11 shows a design of the apparatus according to the invention, in particular for sterile applications. An additional sealing means 68 will be noted in this case, such as for example a folding bellows, which is arranged on the carrier unit 30. It is advantageous for this folding bellows or the sealing device 68 respectively to be rotatable at one end of the aforesaid folding bellows. This can be used in particular when the pre-forms are already sterilized by a sterilization device arranged upstream of the conveying device 2. Further sealing devices of the apparatus are not shown in this case, but can additionally be present.

Figure 12:
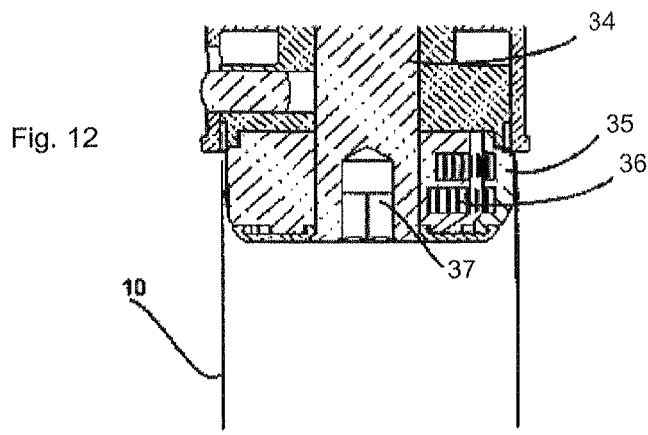
FIG. 12 is an illustration of an engagement element of a holding element.
Figure 13:
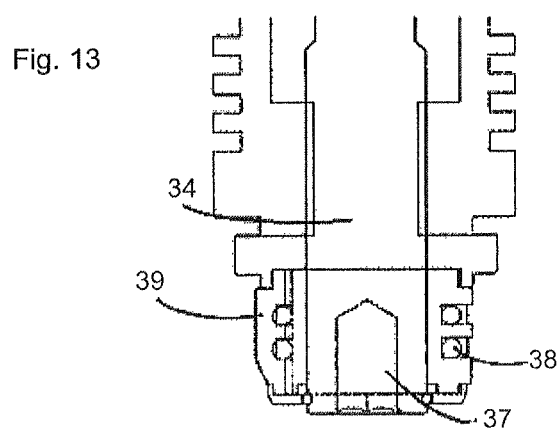
FIG. 13 is a further illustration of the engagement element shown in FIG. 12.
Figure 14:
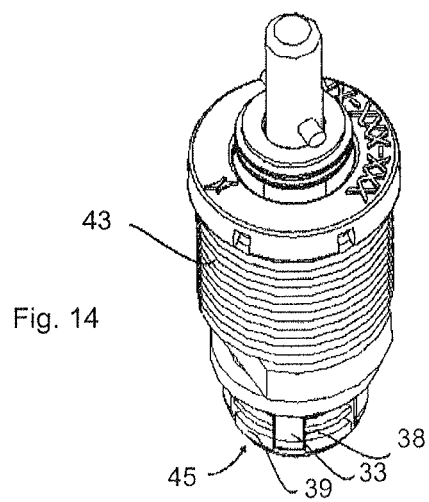
FIG. 14 is a perspective illustration of an engagement element.

FIGS. 12 to 14 are three illustrations of a holding mandrel for holding the plastics material containers, in particular that portion which dips into the apertures of the plastics material pre-forms. A fastening means 37 by which a lower holding portion is arranged on the remaining part of the holding element will first be noted in this case. The reference number 36 designates pre-stressing elements which supply a supply member 35 to the inner wall of the aperture of the plastics material pre-form. The reference number 34 designates a carrier element. A further design is shown in FIG. 13, in which case a pressing action is carried out by resilient elements 38 which are annular in this case and which press a supply element 39 radially outwards. In the illustration shown in FIG. 14, a basic member 43 will likewise again be noted, at the lower end of which are provided supply elements 39 which can press outwards. The reference number 45 designates an engagement portion (in its entirety) which dips into the plastics material pre-forms.

Figure 15:
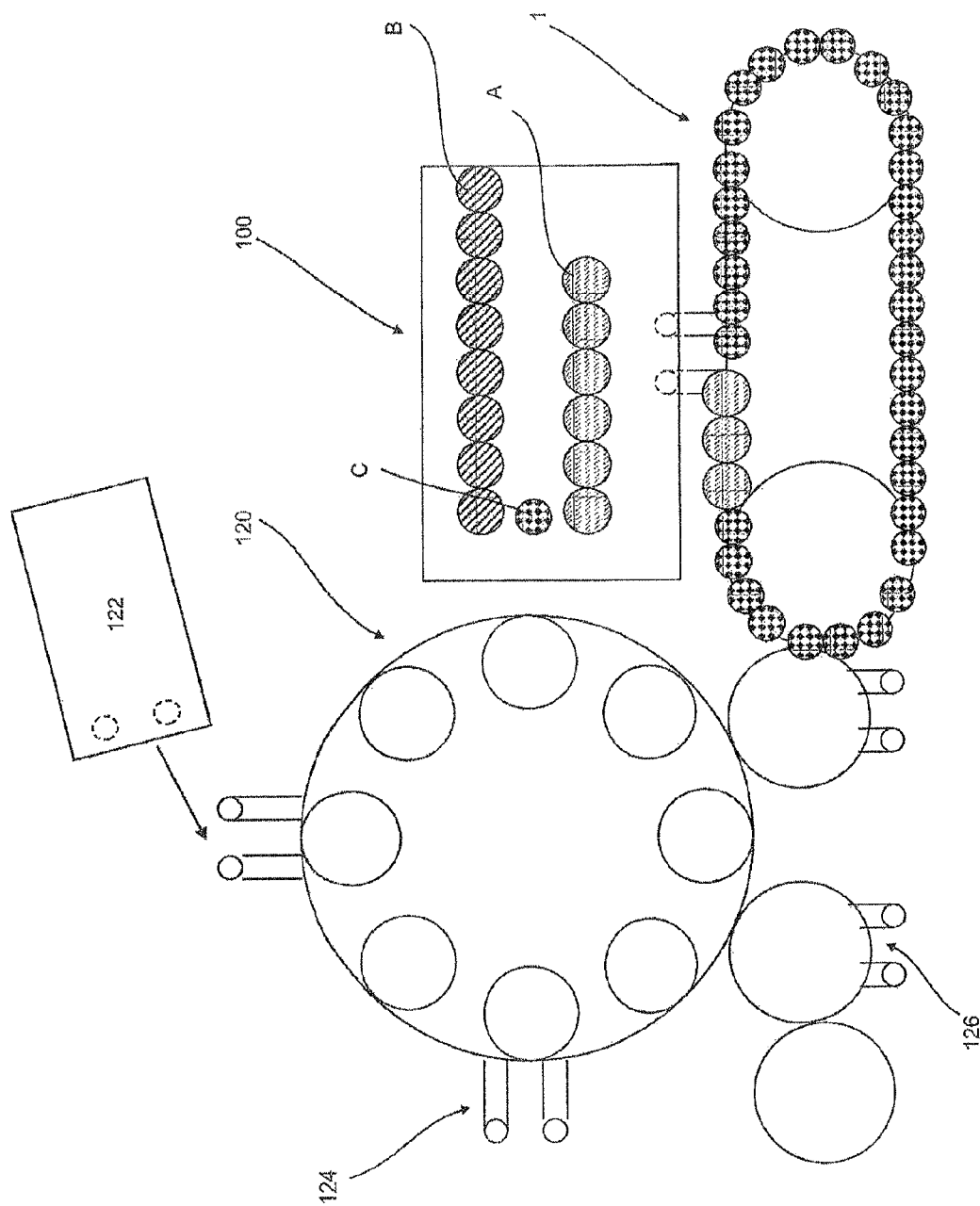
FIG. 15 is an illustration relating to an automatic change of format parts.

FIG. 15 is a diagrammatic illustration to explain a changing operation. As mentioned above, it is preferable for the changing of the screening elements and the holding elements to be carried out fully automatically. For this purpose it is possible for a changing device 100 to be moved to the conveying device 2 and for the individual holding elements with the screening elements to be changed piece by piece. In the case of the embodiment shown here it is possible, in particular, for three different groups of holding elements and screening elements (A, B, C) to be changed. In the illustration shown here the elements designated C are just removed from the apparatus and the elements designated A are supplied. The reference number 120 designates, as mentioned above, a blow moulding machine on which different elements can likewise be changed. In this way for example, blow moulds can be changed by way of an automatic changing device 122, elements such as the stretch rods for example can be changed by way of a docking point 124, and holding elements, such as for example gripping clamps, can be changed by way of a docking point 126.

The change of the groups A, B, C can be carried out, in particular, in a clock-timed manner. The conveying device is moved in this case by a pre-defined number of divisions (the distance between two centre axes of two holding elements) and pauses, and the elements are exchanged at this location. It would also be possible to remove the pre-determined number at a position along the periphery of the conveying device and to insert the next elements to be used at a second position, in particular adjacent.

The Applicants reserve the right to claim all the features disclosed in the application documents as being essential to the invention, insofar as they are novel either individually or in combination as compared with the prior art.

LIST OF REFERENCES 1 apparatus
2 conveying device
4 heating elements
10 plastics material pre-forms
10a carrying ring
22 holding element
22a lower (first) part of the holding element
22b upper (second) part of the holding element
24 screening element
24a opening
25 toothed wheel
30 carrier unit
34 carrier element
35 supply member
37 fastening member
38 annular elements
39 supply element
40 fastening device
43 basic member
45 engagement portion
50 holding apparatus
52 pre-stressing element
53 drive means
54 upper stop of the holding element
55 guide curve
56 stop
62 mounting
64 rotary entrainment means
68 sealing device
72 engagement device
73 spring element
74 coupling element/projection
75 coupling device
76 opening
78 manual lever
82 pre-stressing means
82, 84 magnets
86 centering element
92 guide curve
93 optional spring
94, 98 guide roller
96 guide curve
100 changing device
120 blow moulding machine
122 automatic changing device
124, 126 docking point
132 supply device
134 separating device
156 conveying device
P conveying path
L longitudinal direction
A, B, C groups of holding and screening elements

The invention claimed is:

1. An apparatus for the heating of plastics material pre-forms, comprising a conveying device which conveys the plastics material pre-forms along a pre-set conveying path (P), wherein a plurality of holding elements for holding the plastics material pre-forms and a plurality of screening elements for screening off heat are arranged on the conveying device, wherein the apparatus has a plurality of carrier units on which at least one part of the holding elements and at least one part of the screening elements are arranged and the carrier units are removable from the conveying device as an unit with the parts of the holding elements which are arranged thereon and the screening elements, wherein at least one holding element is designed in at least two parts and a releasable connection is present between the parts of the holding element, and wherein the carrier units are removable from the conveying device without a use of tools.

2. The apparatus according to claim 1, wherein the releasable connection between the parts allows the transmission of torque.

3. The apparatus according to claim 1, wherein the part of the holding element arranged on the carrier unit is rotatable with respect to the carrier unit.

4. The apparatus according to claim 1, wherein the conveying device has arranged on it carrier devices on which the carrier units are arranged in a releasable manner.

5. The apparatus according to claim 1, wherein the carrier units are arranged on the conveying device by releasable fastening devices.

6. The apparatus according to claim 5, wherein at least one of the releasable fastening devices is selected from a group consisting of a bayonet fastening device and a magnetic fastening device.

7. The apparatus according to claim 1, wherein the part of the holding element arranged on the carrier unit is displaceable in its longitudinal direction with respect to the carrier unit.

8. The apparatus according to claim 1, wherein the carrier unit has a pre-stressing device for pre-stressing a part of the holding element arranged on the carrier unit in its longitudinal direction.

9. A holding apparatus for holding plastics material containers, said holding apparatus comprising a carrier unit on which a screening element for screening off heat and at least one part of the holding element are arranged, wherein the carrier unit has a fastening element permitting the carrier unit to be mounted on a conveying device and/or removed from a conveying device as an unit with the screening element and the holding element, wherein at least one holding element is designed in at least two parts and a releasable connection is present between the parts of the holding element, and wherein the carrier units are removable from the conveying device without a use of tools.

10. The holding apparatus according to claim 9, wherein exactly one holding element is allocated to exactly one screening element and this holding element as well as this screening element are allocated to exactly one carrier unit, wherein this carrier unit is connected with a transport device.

11. The holding apparatus according to claim 10, wherein the screening element has an opening which is bigger than a diameter of a plastics material preform to be transported, and wherein the holding device is arranged so that a mouth region of the plastics material preform penetrates this opening during transport.

12. A method of mounting or removing holding elements and screening elements on or from an apparatus for heating of plastics material pre-forms, wherein the holding elements serve to hold plastics material pre-forms and the screening elements serve to keep heat from a thread area of the plastics material pre-forms, wherein at least parts of the holding elements and at least parts of the screening elements are arranged on carrier units which are mounted or removed to or from a conveying device as a unit with parts of the holding elements with screening elements arranged on them, wherein at least one holding element is designed in at least two parts and a releasable connection is present between the parts of the holding element, and wherein the carrier units are removable from the conveying device without a use of tools.

13. A method of mounting or removing holding elements and screening elements on or from an apparatus for the heating of plastics material pre-forms, wherein the holding elements serve to hold plastics material pre-forms and the screening elements serve to keep heat from a thread area of the plastics material pre-forms, whereby the screening elements and the holding elements may be changed as an unit at the same time, wherein at least one holding element is designed in at least two parts and a releasable connection is present between the parts of the holding element, and wherein the carrier units are removable from the conveying device without a use of tools.

14. The method according to claim 13, wherein the screening elements are arranged rotationally fixed or a carrier relative to the rotating holding elements.

15. The holding apparatus according to claim 9, wherein the carrier unit is connected in a releasable manner with a transport device.

16. The apparatus according to claim 1, wherein the part of the holding element arranged on the carrier unit is rotatable with respect to the carrier unit.

17. The apparatus according to claim 2, wherein the conveying device has arranged on it carrier devices on which the carrier units are arranged in a releasable manner.

18. The apparatus according to claim 1, wherein the carrier units are arranged on the conveying device by releasable fastening devices.

19. The apparatus according to claim 18, wherein at least one of the releasable fastening devices is selected from a group consisting of a bayonet fastening device and a magnetic fastening device.

* * * * *